March 24, 1970     N. CURTIS     3,501,844
GYROCOMPASSES
Filed May 26, 1967
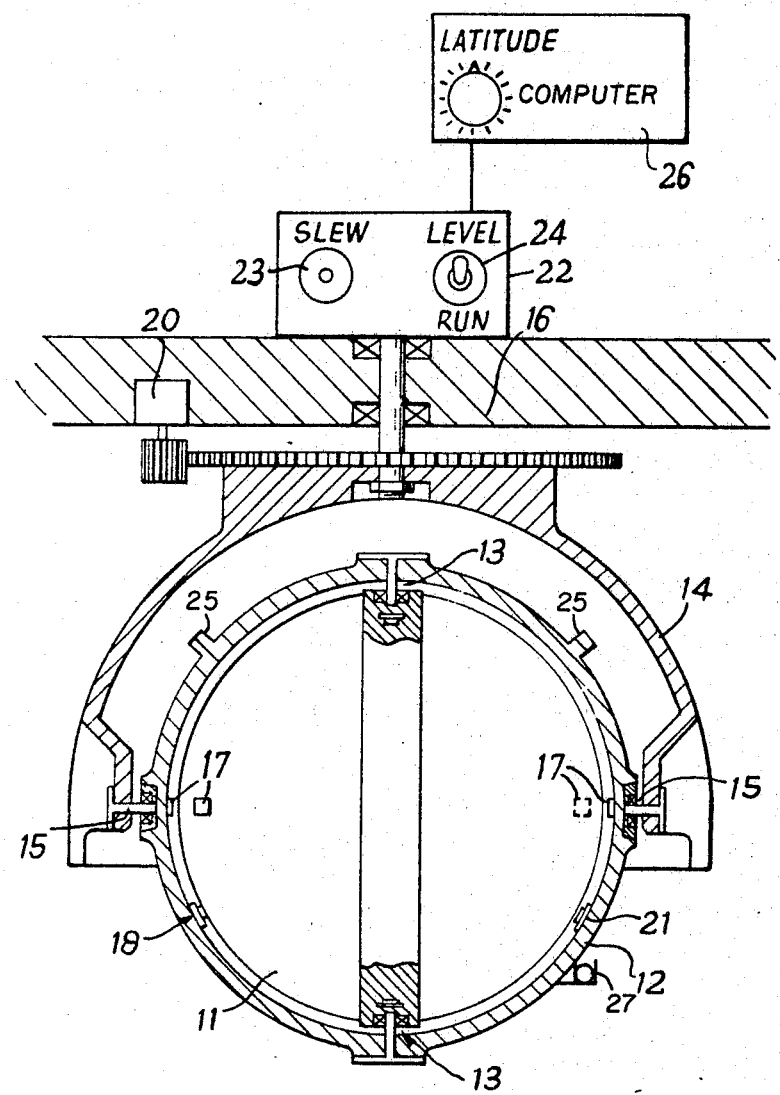
INVENTOR
NORMAN CURTIS

United States Patent Office 3,501,844
Patented Mar. 24, 1970

3,501,844
GYROCOMPASSES
Norman Curtis, Sunbury-on-Thames, England, assignor to Sperry Rand Limited, London, England, a company of Great Britain
Filed May 26, 1967, Ser. No. 641,548
Claims priority, application Great Britain, June 8, 1966, 25,501/66
Int. Cl. G01c 19/38
U.S. Cl. 33—226   3 Claims

ABSTRACT OF THE DISCLOSURE

A gyrocompass of the type wherein the rotor case is supported directly by the vertical ring for relative rotation about a normally vertical axis and the vertical ring is supported for rotation about a horizontal axis upon a follow-up which is motor driven about an azimuth axis of the craft. Stops limit the above vertical axis relative rotation to a small angle, and other stops limit the amount of rotor tilt to an angle which may be 45° or more. The follow-up motor is initially operated to slew the rotor axis rapidly to a nearly meridional position and then is switched to control by a combination of a rotor tilt sensor signal, an attenuated signal of vertical axis relative rotation, and a computer output signal derived from a manual latitude setting, to attain rapid leveling in readiness for normal setting operation.

---

A specific form of the kind of gyrocompass to which the invention relates is described in U.S. Patent No. 3,452,443 which issued from copending application Ser. No. 462,525 filed June 9, 1965 in the name of Richard J. Arthur and assigned to Sperry Rand Corporation.

This invention relates to gyrocompasses of the inverted axes kind, i.e. gyrocompasses in which one or more rotors spins about an axis (or parallel axes), the rotor case or cases being mounted in a vertical gimbal ring with freedom for turning about a normally vertical axis, the vertical gimbal ring being mounted in a follow-up gimbal ring with freedom for turning about a normally horizontal East-West axis, the follow-up gimbal ring in turn having freedom about a normally vertical axis. When first started (i.e. when the rotor commences spinning) the rotor axis starts elliptical damped oscillations around a settling direction, and if the oscillations are large some hours can pass before the oscillations cease and the compass is ready for use. It is therefore advantageous to set the spin axis approximately in said settling direction when starting the compass in order to minimise the amplitude of the oscillations and to reduce their duration. This invention is concerned with this setting of the spin axis.

The invention provides a gyrocompass of the inverted axes kind wherein the rotor case has only limited freedom for rotation about the normally vertical axis relative to the vertical ring and a follow-up motor is connected to tend to rotate the follow-up ring and vertical ring about the vertical axis and arranged normally to be operated to maintain the vertical ring in a predetermined relationship with the rotor spin axis, said compass having provision for levelling the spin axis comprising a tilt detector for detecting tilt of the rotor spin axis, over-ride means for over-riding the normal operation of the follow-up motor and for causing the motor to drive the vertical ring away from said predetermined relationship to one of its limits of freedom so that a tilt-correcting torque about the vertical axis is applied to the rotor case in the sense to cause tilting precession to adjust the detected tilt of the rotor spin axis.

In normal operation the vetrical ring is maintained substantially at right angles to the rotor spin axis, and it should not in use ever be allowed by the follow-up motor to reach the ends of its limited freedom relative to the rotor case, so no torque is applied to the rotor. In one arrangement the follow-up motor is energized by a signal which includes the algebraic sum of a tilt signal and an attenuated version of a normal follow-up signal.

The north-seeking property of the compass is imparted by a torque supplied by a gravity-responsive device (e.g. a liquid ballistic). Unless compensating torques are applied, the spin axis of a gyrocompass controlled by a gravity-responsive device, when the gyro is located at any latitude other than the equator, will settle with a deflection from horizontal in a vertical plane (i.e. a tilt). The deflection is proportional to the sine of the latitude and such that the consequent output torque of the gravity-responsive devices causes the gyro to precess at a rate equal to the local component of the earth's rotation about its axis. At greater latitudes the tilt becomes considerable, and in a preferred embodiment of the compass this is taken into account by the levelling means. According to this embodiment a biasing signal produced by a computor and related to the latitude is algebraically added to the tilt signal to cause the rotor to precess to the required angle of tilt. The latitude of the compass location may be manually fed into the computer at intervals, e.g. by setting a variable potentiometer indexed in latitudes.

The levelling means may include or be associated with azimuth-adjusting means for bringing the rotor spin axis into an approximately North-South direction before the levelling process takes place. This may comprise means for over-riding the normal energization of the follow-up motor for causing the motor to drive the vertical ring and the follow-up ring about a vertical axis.

A specific embodiment of gyrocompass according to the invention is illustrated in the accompanying diagrammatic drawing. The gyrorotor has a spin axis normal to the plane of the paper, and is enclosed in an aluminum shell to form an assembly termed the gyrosphere 11. A vertical ring 12 provides pivotal mountings 13 for the gyrosphere, the mountings being on a vertical axis allowing the gyrosphere limited freedom to rotate relative to the vertical ring about the vertical axis. A pair of co-operating stops 17 on the gyrosphere and ring limit the said freedom to a few degrees in either direction from a normal aligned position in which the spin axis is normal to the plane containing the vertical ring.

Bowl-shaped follow-up ring 14 provides pivotal mountings 15 on a horizontal axis for the vertical ring 12, and is itself mounted for rotation about the vertical axis relative to a stationary support member 16. Preferably member 16 forms the top of an oil-filled chamber in which the compass parts are floated.

The gyrocompass is made north-seeking by a liquid ballistic and its oscillations damped by displacing the centre of gravity of the gyrosphere to the West side of the vertical axis. Neither the liquid ballistic nor the displaced centre of gravity are shown in the drawing since these are well known in the art. Detailed descriptions and explanations are for instance contained in said Patent No. 3,452,443.

An azimuth pick-off 18 comprises an E-section wound core mounted on the ring 12 and a separate armature cemented to the gyrosphere 11. When the vertical ring 12 is aligned with the gyrosphere, i.e. the spin axis is normal to the plane containing the vertical ring, there is a minimum output from the pick-off, but misalignment due to relative rotation about the vertical axis causes an increase in electrical output which is amplified. In normal operation this is applied to the control phase of an azimuth motor 20. This motor is mounted on the support member 16 to drive the follow-up ring 14 about its vertical axis. Since vertical ring 12 is mounted in the follow-up ring 14, it turns therewith, the sense of the rotation being such as to reduce its misalignment with the gyrosphere. The vertical ring is therefore normally maintained closely aligned with the gyrosphere.

The compass heading can be read directly off compass card markings on the top face of the follow-up ring 14 through a viewing window (not shown) in the support member 16. Additionally a heading repeater may be mounted on top of the compass and driven from the follow-up ring 14 by a compass heading transmission system (not shown).

Speed and latitude errors are corrected electrically. Correction signals are derived from a remote correction computer 26 which computes the necessary correction from information obtained from a course resolver (not shown) mounted in the compass. The latitude value is periodically manually set into the computer 26. The correction signal output from the computer 26 is applied to a torquer 21 operating on the gyrosphere from the vertical ring to apply torques to the gyrosphere causing precession of the gyrosphere to correct the error. The torquer 21 comprises an E-section wound core mounted on the vertical ring, the aluminium shell of the gyrosphere 11 forming the armature.

When the gyrocompass is started, the rotor spin axis will have a substantially random position, and if left to itself would oscillate around its final position for several hours before settling. Provision is therefore made according to the invention for bringing the rotor spin axis approximately into its final position on starting by a set procedure so that the settling time is reduced. In the specific procedure described hereinafter the spin axis is first positioned in azimuth, and the tilt of the axis then corrected.

Mounted on top of the compass (in front of the heading repeater where this is provided) is a control panel 22 including two switches designated "slew" switch 23 and "level/run" switch 24. The "slew" switch is spring-urged to an off position and therefore requires constant manual pressure to remain on. The "level/run" switch has two selectable positions, one marked "level" and the other "run."

These switches are manually operated to set the rotor spin axis by applying signals to the azimuth motor 20 which are different from the follow-up signals which control motor 20 in normal operation. The "run" position of the "level/run" switch is the position in which the normal follow-up signal from the azimuth pick-off 18 is applied to motor 20.

On starting, the "level/run" switch is set at "run" while the gyro develops sufficient angular momentum to avoid a levelling signal, obtained as described hereinafter, being applied to motor 20 and causing an excessive rate of precession such that the levelling system may become unstable causing hammering between the vertical ring and gyrosphere stops. When the gyrorotor has reached its normal running speed the switch is placed at "level" and the "slew" switch is operated. Operation of the "slew" switch causes a large operating signal to be applied to the azimuth motor 20, to turn follow-up ring 14 and vertical ring 12 in azimuth. The gyrosphere is prevented by said stops from being misaligned more than a few degrees with the vertical ring. The vertical ring therefore engages one of the stops and thereafter the gyrosphere is subjected to torque about the vertical axis. The normal precession reaction therefore causes the gyrosphere and vertical ring together to tilt about the horizontal axis afforded by bearings 15. The comparatively large torque applied causes the tilt to continue until stops 25 on the vertical ring contact similar stops (not shown) on the inside of the follow-up ring 14. This occurs at an angle to the horizontal of 45° or more. Thereafter the normal precession reaction to the torque is suppressed. A secondary torque reaction is now set up through the stops 25 about the horizontal axis tending to cause precession of the gyrosphere about the vertical axis. Stops 17 cause the vertical ring 12 and therefore the follow-up ring 14 to follow the movement of the gyrosphere. The overall effect therefore is a rotation of the follow-up ring 14, vertical ring 12, and gyrosphere 11, about the vertical axis, with the vertical ring and gyrosphere tilted at 45° to the horizontal. When the compass card or repeater show the heading known to be approximately correct, the "slew" switch is released. The rotor spin axis is now said few degrees off the meridian but is tilted at a large angle to the horizontal.

When the "slew" switch is released, a levelling process automatically starts since the "level/run" switch has been placed in the "level" position. In this position there is applied to the azimuth motor a smaller levelling signal formed from the algebraic addition of (a) a tilt signal from an electrolytic level 27 mounted on the vertical ring 12, (b) a biasing signal related to the latitude obtained from a remote correction computer 26, and (c) an attenuated version of the follow-up signal from azimuth pick-off 18. The azimuth motor therefore now operates to tend to turn the vertical ring in the opposite direction so as to apply a much smaller torque through the gyrosphere stops in the sense to cause the gyro to precess in tilt towards a position in which the rotor axis makes an angle with the horizontal related to said bias signal. This angle is the correct tilt angle for the particular latitude manually set in to the correction computer. Since the action is to return the spin axis towards the horizontal, stops 25 are no longer engaged and there is no further motion about the horizontal axis.

The function of the attenuated follow-up signal is to give sufficient opposition to the electrolytic level signals as the gyrosphere approaches the final position to reduce overshoot. The first effect of the electrolytic level signal due to the large angle of tilt is to swamp the attenuated follow-up signal and to cause the vertical ring to engage one of other of its stops. The follow-up signal therefore always opposes the electrolytic level signal. As the gyro spin axis approaches its final position, however, the electrolytic level signal is reduced to a value at which the follow-up signal has a damping effect thereby reducing any overshoot.

During the "slew" operation the effect of the levelling signal is swamped by the large "slew" signal.

When the correct angle is attained the "level/run" switch is positioned at "run," when the normal follow-up signal is applied to the azimuth motor.

The settling procedure discussed above can be summarized in the following detailed plan of action:

(1) Place "level/run" switch at "run" position,
(2) Switch on gyrorotor and run up for 1 minute,
(3) Replace "level/run" switch to "level" but do not wait for gyro to level,
(4) Operate "slew" switch until compass heading is approximately correct,
(5) Release "slew" switch,
(6) Wait for one minute while levelling takes place,
(7) Switch "level/run" switch to "run" position.

The gyrocompass will then be positioned quite close to its final position and should settle in about one hour. When the true heading is accurately known, a skilled operator can set the compass to within minutes of arc of its final position so reducing still further the settling time.

During the quick-levelling process the normal damping action of the unbalance on the West side of the rotor case will continue. During the "slew" phase its action will be such as to attempt to precess the gyro spin axis towards the horizontal, but this will be swamped by the greater torque applied by the azimuth motor. During the "level" phase, the damping will add to the torque precessing the gyro spin axis towards the horizontal.

What is claimed is:

1. A gyrocompass having a follow-up ring, a vertical ring mounted in the follow-up ring with freedom for relative rotation about a normally horizontal axis, a rotor case mounted in the vertical ring with freedom for relative rotation about a normally vertical axis, limit stop means mounted on the rotor case and on the vertical ring cooperating to limit said relative freedom between the rotor case and the vertical ring, a follow-up motor connected to rotate the follow-up ring about a normally vertical axis, a tilt detector mounted to detect tilt of the rotor spin axis, and levelling switch means connected to the follow-up motor to apply a control signal including the tilt detector output signal to operate the motor, and means for deriving a latitude biasing signal connected to form part of said control signal whereby the follow-up ring and vertical ring are driven about the vertical axis until said limit stop means limit this movement, the motor torque then being applied through the limit stop means to cause tilting precession of the rotor.

2. A gyrocompass having a follow-up ring, a vertical ring mounted on the follow-up ring with freedom for relative rotation about a normally horizontal axis, a rotor case mounted in the vertical ring with freedom for relative rotation about a normally vertical axis, limit stop means mounted on the rotor case and on the vertical ring cooperating to limit the said relative freedom between the rotor case and the vertical ring, a follow-up motor connected to rotate the follow-up ring about a normally vertical axis, an azimuth pick-off mounted between the rotor case and the vertical ring to produce an output representing misalignment of the rotor case and vertical ring, a tilt detector mounted on the vertical ring to detect tilt of the rotor spin axis from the horizontal, a computer adapted to derive a latitude biasing signal from latitude information, and a multi-position switch the output of which is connected to the follow-up motor, one input of which is connected to receive the azimuth pick-off output, and another input of which is connected to receive a control signal derived from the tilt detector output the latitude biasing signal and an attenuated version of the azimuth pick-off output.

3. A method of levelling the rotor spin axis of an inverted axes gyrocompass comprising a follow-up ring, a follow-up motor, a vertical ring mounted in the follow-up ring with freedom for relative rotation about a normally horizontal axis, and a rotor case mounted in the vertical ring with freedom for relative rotation about a normally vertical axis, said method comprising the steps of driving said follow-up ring and said vertical ring about a vertical axis and limiting the relative movement about said vertical axis between the rotor case and the vertical ring so that the driving torque is applied to the rotor case, and said driving step comprises applying the combination of a tilt detector output signal and a latitude biasing signal to control the motor.

References Cited

UNITED STATES PATENTS 3,290,787  12/1966  Brugger _____ 33—226
3,292,269  12/1966  Brugger.

ROBERT B. HULL, Primary Examiner